(12) United States Patent
Xu et al.

(10) Patent No.: US 12,273,440 B2
(45) Date of Patent: Apr. 8, 2025

(54) BLOCKCHAIN DATA ACCESS AUTHORIZATION METHOD, APPARATUS, AND DEVICE

(71) Applicant: CHINA UNIONPAY CO., LTD., Shanghai (CN)

(72) Inventors: Yuzhuang Xu, Shanghai (CN); Tao Zhu, Shanghai (CN); Yu Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 22 days.

(21) Appl. No.: 17/760,497

(22) PCT Filed: Jan. 12, 2021

(86) PCT No.: PCT/CN2021/071293
§ 371 (c)(1),
(2) Date: Aug. 10, 2022

(87) PCT Pub. No.: WO2021/212928
PCT Pub. Date: Oct. 28, 2021

(65) Prior Publication Data
US 2023/0125083 A1 Apr. 27, 2023

(30) Foreign Application Priority Data

Apr. 22, 2020 (CN) .......................... 202010322631.0

(51) Int. Cl.
*H04L 29/06* (2006.01)
*H04L 9/06* (2006.01)
(Continued)

(52) U.S. Cl.
CPC .......... *H04L 9/0656* (2013.01); *H04L 9/3247* (2013.01); *H04L 9/50* (2022.05)

(58) Field of Classification Search
CPC ....... H04L 9/0656; H04L 9/3247; H04L 9/50; H04L 9/3297; H04L 9/00; H04L 9/0813;
(Continued)

(56) References Cited

U.S. PATENT DOCUMENTS

2013/0117824 A1 5/2013 Naslund et al.
2018/0181768 A1* 6/2018 Leporini ................. H04L 63/08
(Continued)

FOREIGN PATENT DOCUMENTS

CN 102882882 A 1/2013
CN 109359601 A * 2/2019
(Continued)

OTHER PUBLICATIONS

The World Intellectual Property Organization (WIPO) International Search Report for PCT/CN2021/071293 Apr. 9, 2021 4 pages.

*Primary Examiner* — Joseph P Hirl
*Assistant Examiner* — Leynna Truvan
(74) *Attorney, Agent, or Firm* — ANOVA LAW GROUP, PLLC

(57) ABSTRACT

A method for authorizing a blockchain data access on a blockchain platform includes: obtaining from a third-party institution a data access request containing a user ID of data access, a data scope, and a random number of a signature, which is generated by the third-party institution after receiving a random number sent by a client terminal and signing on the received random number; performing a verification on the random number of the signature and the data scope; and after the verification is passed, sending data ciphertext corresponding to the user ID to the third-party institution, such that the third-party institution decrypts the data ciphertext using a data secret key sent by the client terminal.

20 Claims, 5 Drawing Sheets

(51) Int. Cl.
*H04L 9/32* (2006.01)
*H04L 9/00* (2022.01)

(58) Field of Classification Search
CPC ... H04L 9/083; H04L 9/321; H04L 29/06632; H04L 63/062; H04L 9/0802; H04L 9/0819; H04L 29/06639; H04L 29/06646; H04L 29/06653; H04L 29/06721; H04L 63/0414; H04L 63/0421; H04L 65/403; H04L 60/23; H04L 9/06556; H04L 9/006; H04L 9/0825; H04L 9/03; H04L 9/0838; G06F 21/31; G06F 21/602; G06F 21/6218; G06F 21/1048; G06F 21/645; G06F 221/0786; G06F 2211/008; G06F 2221/0713; G06F 2221/0751; G06F 7/58; G06F 7/582; G06F 7/4824; G06Q 20/0855; G06Q 30/0613; G06Q 2220/123; G04B 47/005; G07B 2017/00895; G07B 2017/00758; G07B 2017/00911; G07B 2017/0087; G07B 2017/00919; G11B 20/00362; G11B 20/00413; G11B 20/00144; G11B 20/00492; G01D 5/2495; G05B 2219/36542; G10H 2250/211; G10H 2240/101; G03G 15/5091; H04B 7/18565; H04W 12/04071; H04W 12/0471; H04N 21/63775; H04N 21/25875; H04N 21/278; H04N 21/4182; H04N 21/441; H04N 21/4508; H04N 21/4753; H04N 2201/3205

See application file for complete search history.

(56) References Cited

U.S. PATENT DOCUMENTS

| | | | |
|---|---|---|---|
| 2018/0330386 A1* | 11/2018 | Kim | H04L 63/0823 |
| 2019/0122300 A1* | 4/2019 | O'Brien | G07F 17/3244 |
| 2019/0182042 A1* | 6/2019 | Ebrahimi | H04L 9/0894 |
| 2020/0057871 A1* | 2/2020 | Hartley | G06F 40/174 |

FOREIGN PATENT DOCUMENTS

| | | | |
|---|---|---|---|
| CN | 109543443 A | | 3/2019 |
| CN | 109951489 A | * | 6/2019 |
| CN | 110837652 A | | 2/2020 |
| CN | 111552935 A | | 8/2020 |
| TW | 202013944 A | | 4/2020 |

* cited by examiner

Data access authorization

BLOCKCHAIN DATA ACCESS AUTHORIZATION METHOD, APPARATUS, AND DEVICE

CROSS-REFERENCE TO RELATED APPLICATIONS

This application is a national stage application of International Application No. PCT/CN2021/071293, filed Jan. 12, 2021, which claims priority to Chinese Patent Application No. 202010322631.0, titled "BLOCKCHAIN DATA ACCESS AUTHORIZATION METHOD AND APPARATUS," filed on Apr. 22, 2020, the content of all of which is incorporated by reference in their entirety.

FIELD OF THE TECHNOLOGY

This application relates to the field of blockchain technologies and, specifically, to a blockchain data access authorization method, apparatus, and device.

BACKGROUND

When handling certain banking businesses, in order to prevent users from repeatedly filling in the card application information, a card service provider can use the blockchain technology to directly provide data services to the card issuing bank. However, in order to protect the ownership and privacy of the data, the card service provider cannot directly obtain the clear text of the user information, and the card issuer needs to obtain the user's authorization to obtain the data. Therefore, it is necessary to design an authorization scheme to protect data privacy while ensuring data services.

SUMMARY

The embodiments of the present invention provide a blockchain data access authorization method, apparatus, and device to realize user-controllable data access authorization, protecting data privacy.

In a first aspect, embodiments of the present invention provide a method for authorizing a blockchain data access, including:
  obtaining, by a blockchain platform, a data access request from a third-party institution, wherein the data access request includes a user ID of data access, a data scope, and a random number of a signature, wherein the random number of the signature is generated by the third-party institution after receiving a random number sent by the client terminal and signing on the received random number, and wherein the random number sent by the client terminal is generated after the client terminal receives an authorization request sent by the third-party institution and determines to authorize the blockchain data access from the third-party institution;
  performing, by the blockchain platform, a verification on the random number of the signature and the data scope; and
  after determining that the verification is passed, sending, by the blockchain platform, data ciphertext corresponding to the user ID to the third-party institution, such that the third-party institution decrypts the data ciphertext using a data secret key sent by the client terminal;

According to the above technical solutions, the blockchain platform verifies the random number, data scope, data access time, and other information in the data access request of the third-party institution based on the data verification information authorized by the client terminal, so that the user's data can be accurately controlled, and the user can also control the scope and timing of third-party data access. Since the client terminal will generate a random number every time the third-party institution sends an authorization request, the random number of each authorization request can be different, so that it can be guaranteed that one authorization can only be used for one access. If the third-party institution needs to access again, then it is necessary to send an authorization request to the client terminal again, so that the user can control its own private data and improve data protection.

Optionally, the performing, by a blockchain platform, a verification on the random number of the signature and the data scope, further includes:
  using, by the blockchain platform, the third-party public key to verify the random number of the signature; and
  using, by the blockchain platform, a data scope of data access sent by the client terminal to verify the data scope.

Optionally, before sending data ciphertext corresponding to the user ID to the third-party institution, the method further includes:
  determining, by the blockchain platform, that a timer of the data access request has not timed out, wherein the timer of the data access request is started after receiving data verification information sent from the client terminal.

Optionally, before obtaining the data access request from the third-party institution, the method further includes:
  obtaining, by the blockchain platform, the data verification information sent by the client terminal, wherein the data verification information includes the random number, the third-party public key, the data scope of data access, and the time of data access; and
  starting, by the blockchain platform, the timer of the data access request according to the time of data access, and registering the random number, the third-party public key, and the data scope of data access.

Optionally, before obtaining the data verification information sent by the client terminal, the method further includes:
  obtaining, by the blockchain platform, data storage information sent by the client terminal, wherein the data storage information includes the user ID and the data ciphertext corresponding to the user ID, and wherein the data ciphertext is obtained after encrypting the data by the client terminal using the symmetric secret key of the client terminal; and
  storing, by the blockchain platform, the data ciphertext corresponding to the user ID and the user ID.

Optionally, after storing the data ciphertext corresponding to the user ID and the user ID, the method further includes:
  obtaining, by the blockchain platform, a new data ciphertext sent by the client terminal, wherein the new data ciphertext is obtained after encrypting a new data by the client terminal using the symmetric secret key; and
  overwriting, by the blockchain platform, the data ciphertext with the new data ciphertext.

Optionally, storing the data ciphertext corresponding to the user ID and the user ID, the method further includes:
  obtaining, by the blockchain platform, a data request sent by the client terminal;
  sending, by the blockchain platform, the data ciphertext to the client terminal, such that the client terminal decrypts the data ciphertext and encrypts the data with a new symmetric secret key;

obtaining, by the blockchain platform, a data storage request sent by the client terminal, wherein the data storage request includes a new data ciphertext that is encrypted by the client terminal using the new symmetric secret key; and overwriting, by the blockchain platform, the data ciphertext with the new data ciphertext.

In a second aspect, embodiments of the present invention provide a blockchain data access authorization apparatus, comprising:

an obtaining unit configured to obtain a data access request from a third-party institution, wherein the data access request includes a user ID of data access, a data scope, and a random number of a signature, wherein the random number of the signature is generated by the third-party institution after receiving a random number sent by the client terminal and signing on the received random number, and wherein the random number sent by the client terminal is generated after the client terminal receives an authorization request sent by the third-party institution and determines to authorize the blockchain data access from the third-party institution;

a processing unit configured to perform a verification on the random number of the signature and the data scope; and a sending unit configured to, after determining that the verification is passed, send data ciphertext corresponding to the user ID to the third-party institution, such that the third-party institution decrypts the data ciphertext using a data secret key sent by the client terminal;

Optionally, the processing unit is further configured to:
use the third-party public key to verify the random number of the signature; and
use a data scope of data access sent by the client terminal to verify the data scope.

Optionally, the processing unit is further configured to:
before sending the data ciphertext corresponding to the user ID to the third-party institution, determine that a timer of the data access request has not timed out, wherein the timer of the data access request is started after receiving data verification information sent from the client terminal.

Optionally, the processing unit is further configured to:
before obtaining the data access request from the third-party institution, obtain the data verification information sent by the client terminal, wherein the data verification information includes the random number, the third-party public key, the data scope of data access, and the time of data access; and
start the timer of the data access request according to the time of data access, and registering the random number, the third-party public key, and the data scope of data access.

Optionally, the processing unit is further configured to:
before obtaining the data verification information sent by the client terminal, obtain data storage information sent by the client terminal, wherein the data storage information includes the user ID and the data ciphertext corresponding to the user ID, and wherein the data ciphertext is obtained after encrypting the data by the client terminal using the symmetric secret key of the client terminal; and
store the data ciphertext corresponding to the user ID and the user ID.

Optionally, the processing unit is further configured to:
after storing the data ciphertext corresponding to the user ID and the user ID, obtain a new data ciphertext sent by the client terminal, wherein the new data ciphertext is obtained after encrypting a new data by the client terminal using the symmetric secret key; and
overwrite the data ciphertext with the new data ciphertext.

Optionally, the processing unit is further configured to:
obtain a data request sent by the client terminal;
send the data ciphertext to the client terminal, such that the client terminal decrypts the data ciphertext and encrypts the data with a new symmetric secret key;
obtain a data storage request sent by the client terminal, wherein the data storage request includes a new data ciphertext that is encrypted by the client terminal using the new symmetric secret key; and
overwrite the data ciphertext with the new data ciphertext.

In a third aspect, embodiments of the present invention provide a computing device, comprising:
a memory for storing program instructions; and
a processor configured to call the program instructions stored in the memory, and execute a method according to any of claims 1 to 7 according to the obtained program.

In a fourth aspect, embodiments of the present invention provide a computer-readable non-volatile storage medium, comprising computer-readable instructions for, when a computer reads and executes the computer-readable instructions, causing the computer to execute the above methods.

In a fifth aspect, embodiments of the present invention provide a blockchain data access authorization device, comprising:
at least one processor; and
a memory communicatively coupled to the at least one processor; wherein,
the memory stores instructions executable by the at least one processor, and the instructions are executed by the at least one processor to enable the at least one processor to perform the execution of the above method.

BRIEF DESCRIPTION OF THE DRAWINGS

In order to more clearly illustrate the technical solutions in the embodiments of the present invention, the drawings used in the description of the embodiments will be briefly described below. It is obvious that the drawings in the following description are only some embodiments of the present invention, and those skilled in the art can obtain other drawings based on these drawings without inventive efforts.

DESCRIPTION OF EMBODIMENTS

To make clearer of the objectives, technical solutions, and advantages of the present disclosure, the followings further describe the present disclosure in detail with reference to the accompanying drawings. Obviously, the described embodiments are only some but not all of the embodiments of the present disclosure. All other embodiments obtained by a person of ordinary skill in the art based on the disclosed embodiments of the present disclosure without creative efforts are within the scope of the present disclosure.

Figure 1:
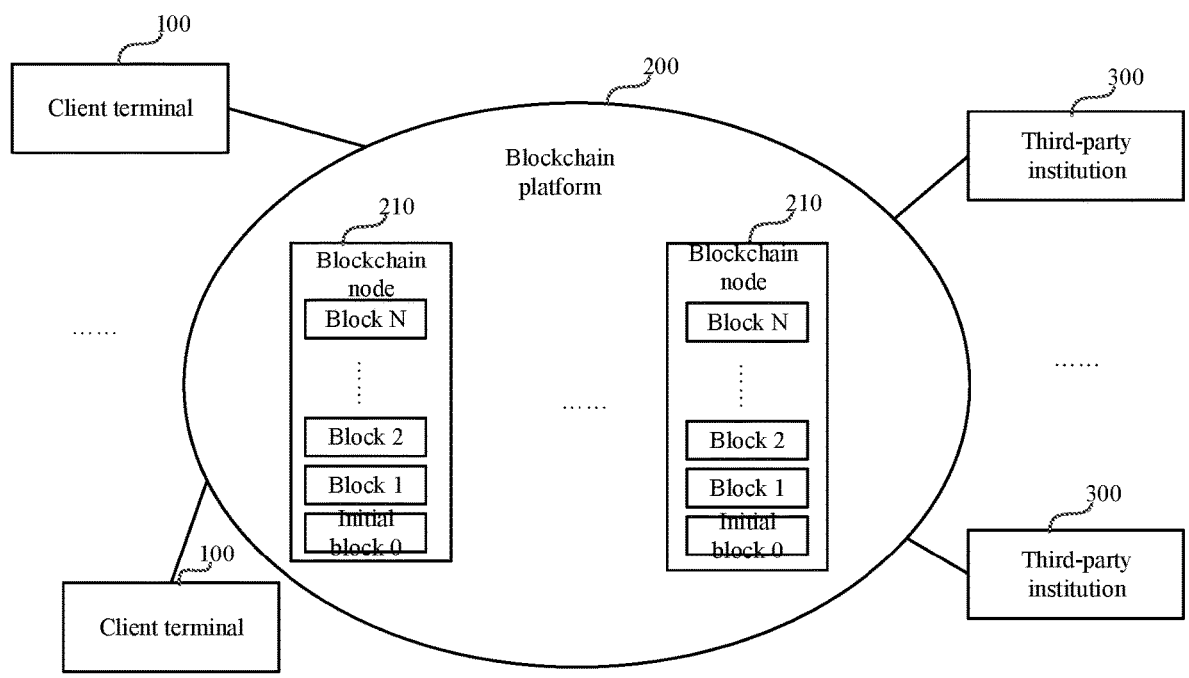
FIG. 1 illustrates a schematic diagram of a system architecture according to an embodiment of the present invention.

FIG. 1 exemplarily shows a system architecture to which embodiments of the present invention may be applicable, and the system architecture may include multiple client terminals 100, a blockchain platform 200, and multiple third-party institutions 300.

A client terminal 100 is used for communicating with the blockchain platform 200, and sending the data ciphertext to the blockchain platform 200 for storage on the chain.

A third-party institution 300 is a computer(s) used by an institution (e.g., a bank or a financial organization) to access the data ciphertext stored by the client terminal 100 from the blockchain platform 200 under the authorization of the client terminal 100.

The blockchain platform 200 includes a plurality of blockchain nodes 210, which communicate with the client terminal 100 and the third-party institution 300, and are used to process and store the data ciphertext sent by the client terminal 100. After the verification of the access request is passed, the ciphertext of the data stored by the client terminal 100 is sent to the third-party institution 300. The plurality of blockchain nodes 210 can be connected and communicate with each other, and each blockchain node 210 includes a plurality of blocks, and the blocks are used to store the data ciphertext sent by the client terminal 100.

It should be noted that the structure shown in FIG. 1 above is only an example, which is not limited in the embodiments of the present invention.

Figure 2:
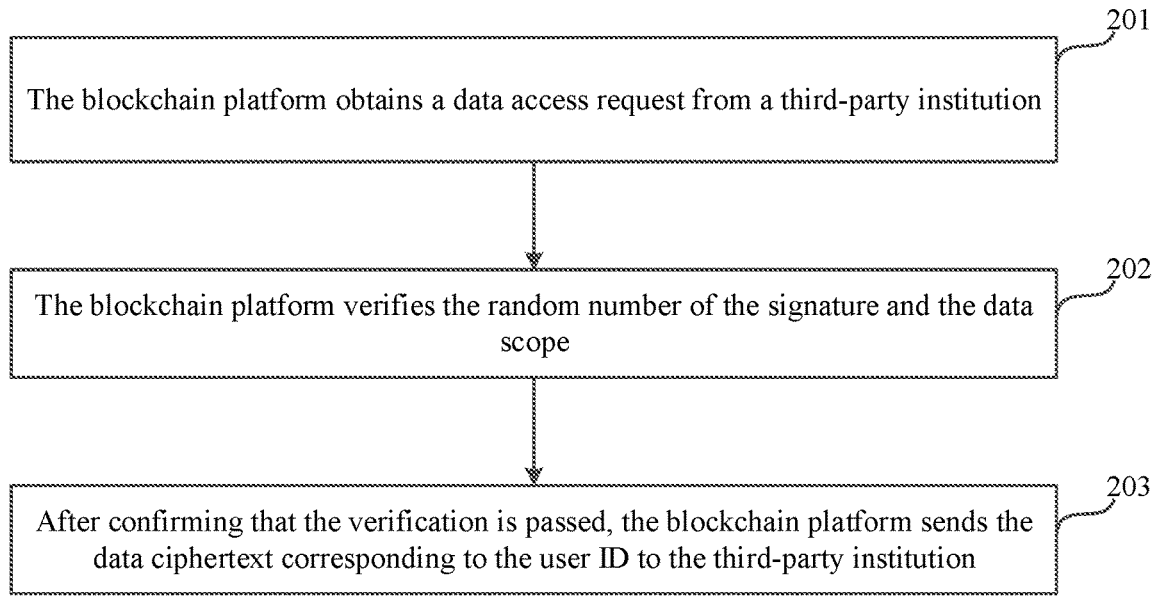
FIG. 2 illustrates a flowchart of a blockchain data access authorization method according to an embodiment of the present invention.

Based on the above description, FIG. 2 shows in detail a process for authorizing blockchain data access according to an embodiment of the present invention. The process may be executed by an apparatus for authorizing blockchain data access, and the apparatus may be located at a blockchain node, or may coincide with the blockchain node.

As shown in FIG. 2, the process may specifically include:

Step 201, the blockchain platform obtains a data access request from a third-party institution.

The data access request may include the user ID (identifier) of the data access, the data scope, and the random number of the signature, wherein the random number of the signature is generated by the third-party institution after receiving a random number sent by the client terminal and signing on the received random number. The random number sent by the client terminal is generated after the client terminal receives the authorization request sent by the third-party institution and determines to authorize the data access from the third-party institution.

Before obtaining the data access request from the third-party institution, the blockchain platform obtains the data verification information sent by the client terminal, and the data verification information may include a random number, a third-party public key, the data scope and time of the data access. Further, according to the time of data access, the timer of the data access request is started, and the random number, the third-party public key, and the data scope of the data access are registered. The third-party public key is the public key of the third-party institution.

At the same time, the blockchain platform may also obtain the data storage information sent by the client terminal, and the data storage information includes the user ID and the data ciphertext corresponding to the user ID. The data ciphertext may be obtained by the client terminal using the symmetric secret key of the client terminal to encrypt the data. The blockchain platform stores the user ID and the data ciphertext corresponding to the user ID.

Figure 3:
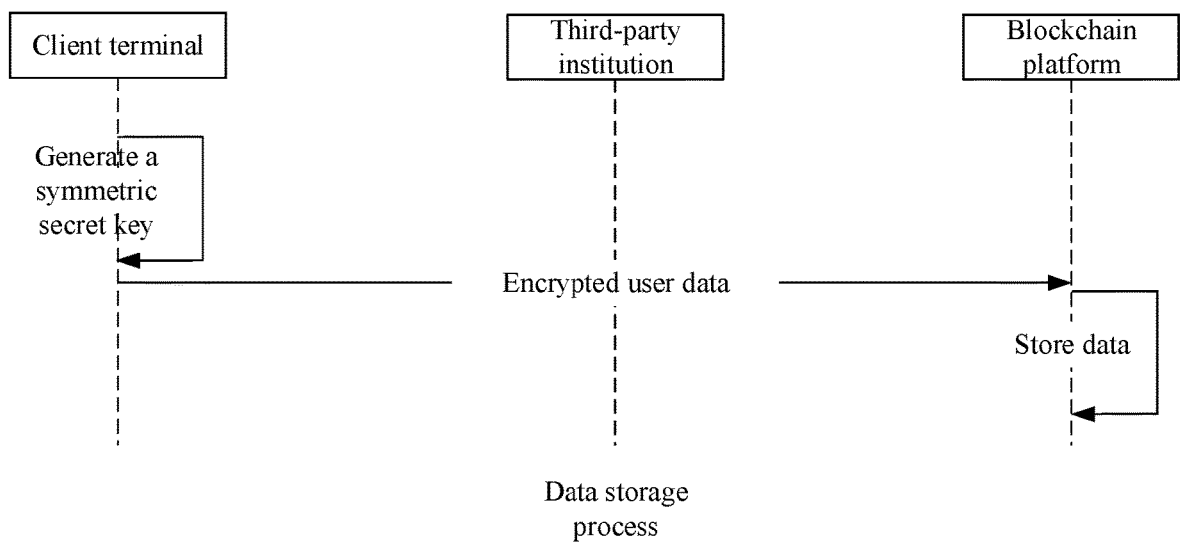
FIG. 3 illustrates a schematic diagram of data storage according to an embodiment of the present invention.

For example, as shown in FIG. 3, steps for the client terminal to store data to the blockchain platform include followings:

(1) The client terminal generates a symmetric secret key;

(2) The client terminal uses its own symmetric secret key to encrypt the data, and sends the encrypted data to the blockchain platform;

(3) The blockchain platform stores encrypted data.

Figure 4:
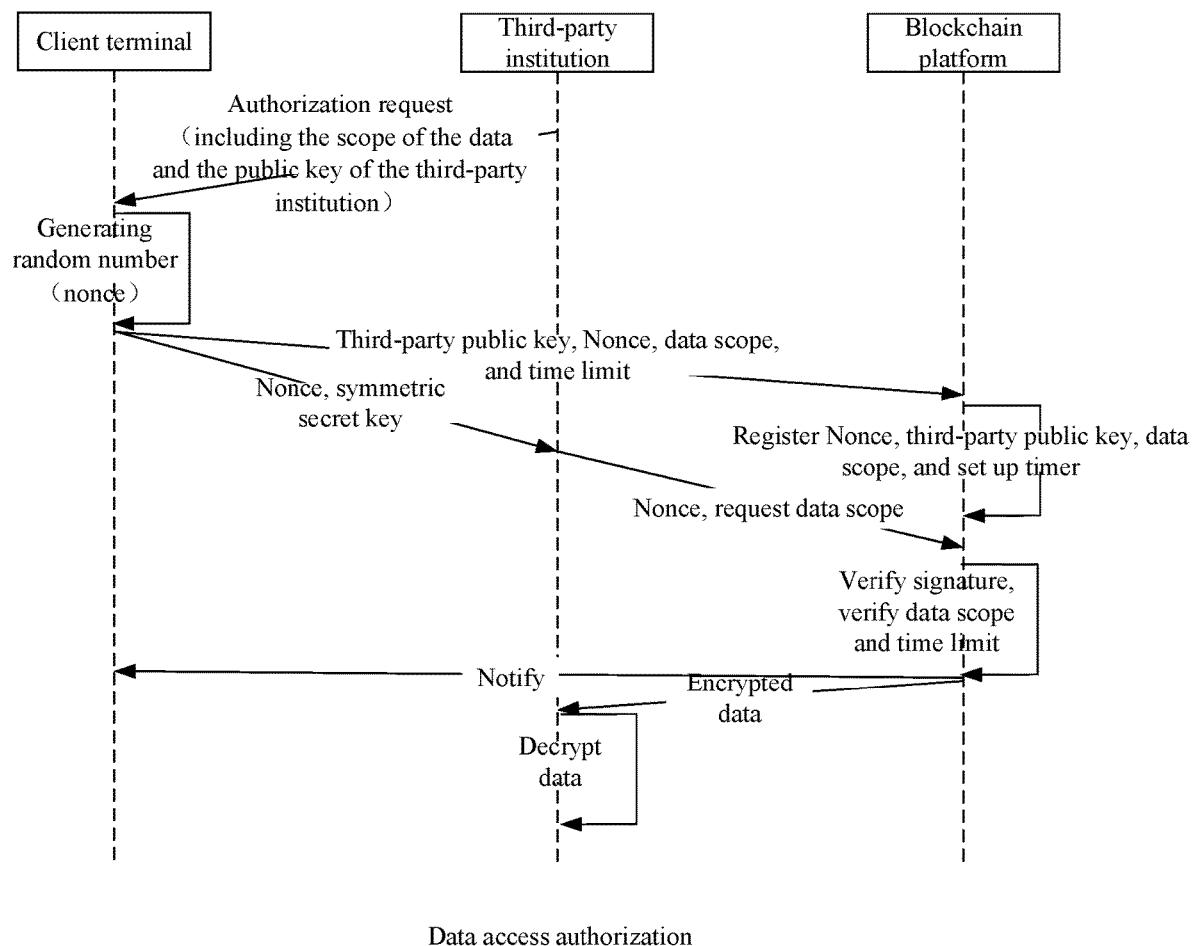
FIG. 4 illustrates a schematic diagram of data access according to an embodiment of the present invention.

When a third-party institution performs an authorized data access, as shown in FIG. 4, steps for the third-party institution of user-authorized data access includes followings:

(1) The third-party institution sends an authorization request to the client terminal, including the scope of the data and the public key of the third-party institution.

(2) After the client terminal determines to grant the authorization, a random nonce (a random number) is generated;

(3) The client terminal sends the generated nonce, the third-party public key, the scope and time limit of data access to the blockchain platform and, at the same time, sends the same nonce and the symmetric secret key of the data to the third-party institution.

(4) After receiving the request, the blockchain platform registers the nonce, third-party public key, and data access scope, and then sets a timer according to the data access time limit.

Step 202, the blockchain platform verifies the random number of the signature and the data scope.

Specifically, the blockchain platform may use the third-party public key to verify the random number of the signature, that is, using the third-party public key to verify whether the signature is correct. Further, the data scope of the data access sent by the client terminal is used to verify the data scope, and the verification is passed when the data scopes are the same.

Since the client terminal may generate a random number every time the third-party institution sends an authorization request, the random number of each authorization request can be different, so that it can be guaranteed that one authorization can only be used for one access. If the third-party institution needs to access again, it is necessary to send an authorization request to the client terminal again, so that the user can control their own private data and improve data protection.

In addition, the time of the data access request from the third-party institution can also be verified to verify whether the third-party institution's data access has timed out. Mainly to confirm whether the timer of the data access request has timed out. The timer of the data access request is started after receiving the data verification information sent by the client terminal.

By setting a timer to limit the data access time of the third-party institution, the function of one authorization for one access can be further realized.

That is, as shown in FIG. 4, the blockchain platform verifies the nonce signature through the deployed smart contract, verifies the requested data scope, and determines whether the timer has timed out.

Step 203: After confirming that the verification is passed (i.e., the signature is correct, the data scopes match, and the timer has not timed out), the blockchain platform sends the data ciphertext corresponding to the user ID to the third-party institution.

After the blockchain platform confirms that the verification is passed in Step 202, the corresponding data ciphertext can be sent to the third-party institution. As shown in FIG. 4, if all the conditions are met, the corresponding data ciphertext is returned to the third-party institution; otherwise, the request of the third-party institution is rejected. At the same time, the client terminal is notified. That is, after the conditions are met, according to the data scope, the blockchain platform will send the corresponding data ciphertext that meets the data scope to the third-party institution.

After receiving the data ciphertext, the third-party institution decrypts the data using the data secret key sent by the client terminal to obtain the data plaintext.

It should be noted that after storing the data in the blockchain platform, the client terminal can also change the data and change the secret key. Specifically:

The data changing process can include:

The blockchain platform obtains the new data ciphertext sent by the client terminal, where the new data ciphertext is generated by the client terminal via encrypting the new data with a symmetric secret key. The blockchain platform overwrites the stored data ciphertext with the new data ciphertext.

The blockchain platform obtains the data request sent by the client terminal;

The secret key changing process can include:

First, the blockchain platform sends the data ciphertext to the client terminal, so that the client terminal can decrypt the data ciphertext to obtain the data and then to encrypt the data with a new symmetric secret key. Further, the blockchain platform obtains the data storage request sent by the client terminal, and the data storage request includes the new data ciphertext that is the data encrypted by the client terminal using the new symmetric secret key. Finally, the blockchain platform overwrites the stored data ciphertext with the new data ciphertext.

Figure 5:
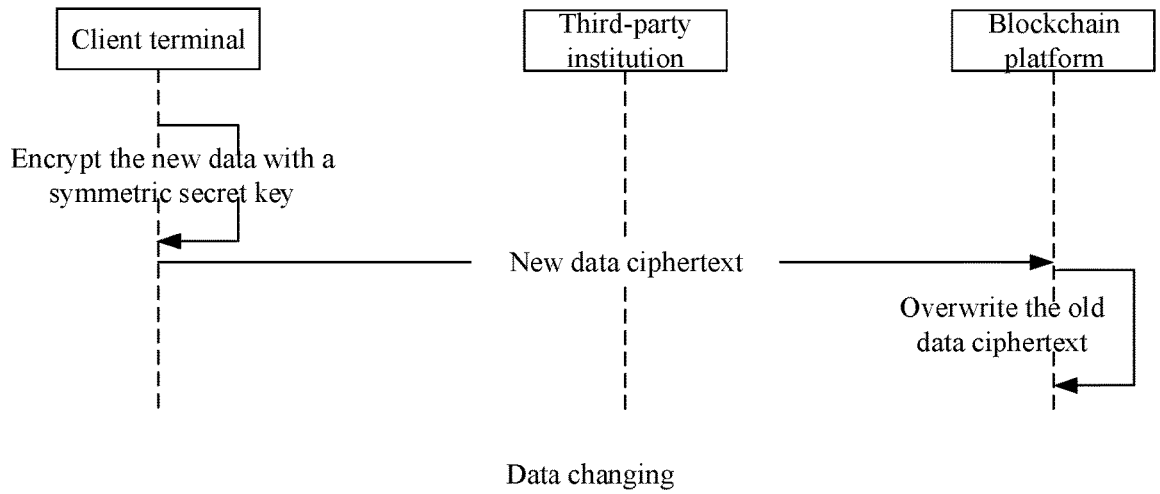
FIG. 5 illustrates a schematic diagram of data changing process according to an embodiment of the present invention.

For example, as shown in FIG. 5, steps for data changing include followings:

(1) The client terminal encrypts the new data with the secret key;
(2) The client terminal sends the encrypted data to the blockchain platform;
(3) The blockchain platform overwrites the old data ciphertext with the new data ciphertext.

Figure 6:
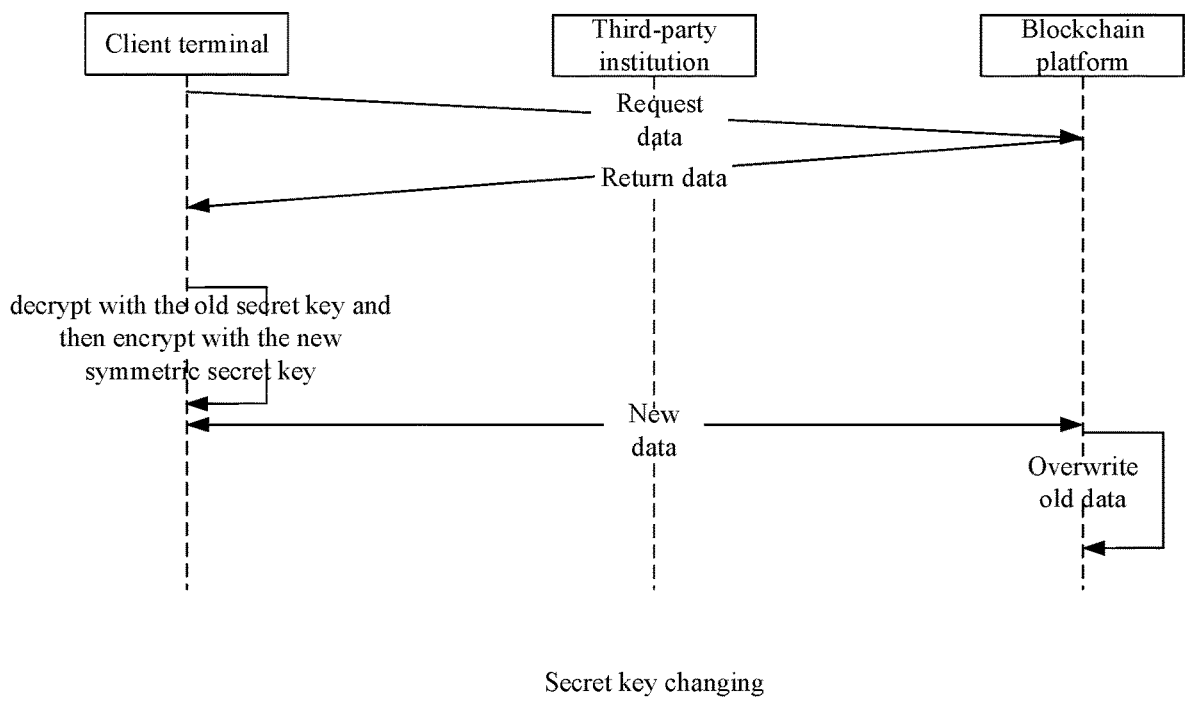
FIG. 6 illustrates a schematic diagram of secret key changing process according to an embodiment of the present invention.

As shown in FIG. 6, the client terminal's data secret key can be changed automatically and regularly, or manually. The process for changing the key include followings:

(1) The client terminal requests data from the blockchain platform;
(2) The blockchain platform returns data;
(3) The client terminal decrypts the data with the old secret key and encrypts the decrypted data with the new secret key;
(4) The client terminal sends the encrypted new data to the blockchain platform;
(5) The blockchain platform overwrites the old data with the new data.

In order to better explain the embodiments of the present invention, the foregoing process of authorizing data access will be described below in certain specific implementation scenarios.

Embodiment 1: User Authorization for the One-Key-Through Service

The user of the client terminal may use some functions of the data and private key management APP. The functions may include: private key generation, data encryption and decryption, random nonce generation, and other functions;

The third-party institution is a bankcard issuing platform in this case, which can generate a pair of public and private keys, with functions including signing/signature and data decryption;

The blockchain platform adopts the Hyperledger fabric platform and, through chain code, realizes functions including user data storage, signature verification, data scope filtering, and timer, etc., and provides RESTful API interface to the outside world.

These three parties can connect to each other through the Internet and access each other via the http protocol.

In such implementation scenario, the data storage and data authorization process may include:

(1) The APP on the client terminal uses the AES symmetric encryption algorithm to generate the symmetric secret key, encrypts the personal information, obtains the data ciphertext, and calls the data storage interface of the smart contract on the blockchain platform to store the data ciphertext on the blockchain platform.

(2) The third-party institution forms an authorization request, and the request includes the data scope for the user name, mobile phone number, ID number and other information, and generates a public key.

(3) The APP on the client terminal receives the authorization request from the third-party institution and notifies the user to authorize. The user confirms the scope via the client terminal. If the authorization is confirmed and the time limit for authorization is selected, the APP on the client terminal generates a random nonce string. Otherwise, rejection information is returned to the third-party institution, and the process ends.

(4) The APP on the client terminal sends the nonce string, the public key of the third-party institution, the data scope, and the time limit to the blockchain platform by calling the authorization interface of the smart contract of the blockchain platform. At the same time, the APP on the client terminal sends the nonce string and the AES secret key to the third-party institution (network data may be encrypted with tls/ssl);

(5) After the authorization interface of the smart contract of the blockchain platform receives the information from the APP on the client terminal, it registers the nonce string, the public key of the third-party institution, and the data scope, and sets a timer according to the time limit;

(6) After receiving the information sent by the APP of the client terminal, the third-party institution signs the nonce string with its own private key, and forms a data access request, including data access scope, signature, and other information, and sends the data access request to the data access interface of the smart contract of blockchain platform.

(7) After receiving the request, the data access interface of the smart contract of the blockchain platform first verifies the signature with the registered nonce and the private key of the third-party institution, and then judges whether the data access scope matches the registered data scope, and whether the timer times out. If all the conditions are met, the data ciphertext within the specific data scope is filtered from the user information, and returned to the third-party institution and, at the same time, the APP of the client terminal is notified of the third-party institution's data access. Otherwise, the request of the third-party institution is rejected.

(8) After receiving the data ciphertext returned by the blockchain platform, the third-party institution decrypts the data ciphertext with the data secret key received in Step (6) to obtain the user data plaintext.

It should be noted that, in the process of practical applications, the above-mentioned blockchain platform may use other frameworks; or may use non-blockchain data platforms. The above-mentioned client terminal APP may be replaced with official account services, web services, computer client terminals and other similar forms. The above-mentioned client terminal secret key can be stored in a trusted execution environment such as TEE. The above encryption and decryption functions can be performed in a TEE or an encryption machine. The above encryption and decryption algorithms may adopt algorithms such as DES, 3DES, and Guomi, etc. Further, more access conditions can be set, such as the number of data accesses, and registered restrictions of the data itself. The above-mentioned user can be another institution, and the data can be institutional data to realize authorized data access between institutions.

As illustrated in the above embodiments, the blockchain platform obtains a data access request from a third-party institution, and the data access request includes the user ID of the access data, the data scope, and the random number of the signature. The random number of the signature is the random number received by the third-party institution from the client terminal and signed by third-party institution. The random number sent by the client terminal is generated after the client terminal receives the authorization request sent by the third-party institution and determines granting the data authorization of the third-party institution. The random number of the signature and the data scope are then verified. After the verification is passed, the data ciphertext corresponding to the user ID is sent to the third-party institution, so that the third-party institution can decrypt the data ciphertext using the data secret key sent by the client terminal. Based on the data verification information authorized by the client terminal, the blockchain platform verifies the random number, data scope, data access time, and other information in the data access request of the third-party institution, so that the user's data can be accurately controlled, and the user can also control the scope and timing of third-party data access. Since the client terminal will generate a random number every time the third-party institution sends an authorization request, the random number of each authorization request can be different, so that it can be guaranteed that one authorization can only be used for one access. If the third-party institution needs to access again, then it is necessary to send an authorization request to the client terminal again, so that the user can control its own private data and improve data protection.

Figure 7:
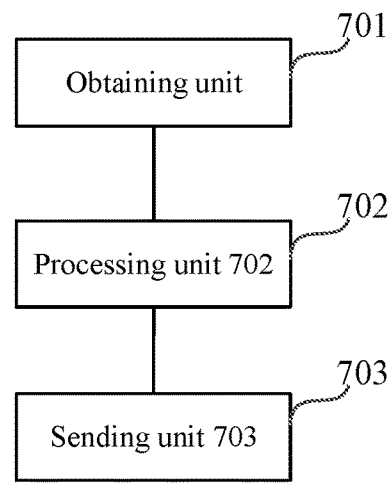
FIG. 7 illustrates a structural diagram of a blockchain data access authorization apparatus according to an embodiment of the present invention.

Based on the similar technical concepts, FIG. 7 exemplarily shows the structure of a block chain data access authorization apparatus provided by an embodiment of the present invention, and the apparatus can execute a blockchain data access authorization process.

As shown in FIG. 7, the apparatus may specifically include:

An obtaining unit 701, which is used to obtain a data access request from a third-party institution. The data access request may include the user ID of the data access, the data scope, and the random number of the signature, wherein the random number of the signature is generated by the third-party institution after receiving a random number sent by the client terminal and signing on the received random number. The random number sent by the client terminal is generated after the client terminal receives the authorization request sent by the third-party institution and determines to authorize the data access from the third-party institution;

A processing unit 702, which is used to process the random number of the signature and the data scope;

The sending unit 703 is used to send the data ciphertext corresponding to the user ID to the third-party institution, such that the third-party institution decrypts the data ciphertext using the data secret key sent by the client terminal.

Optionally, the processing unit 702 is specifically configured to:

Use the third-party public key to verify the random number of the signature, and use the data scope of the data access sent by the client terminal to verify the data scope;

Optionally, the processing unit 702 is further configured to:

Before sending the data ciphertext corresponding to the user ID to the third-party institution, determine that the timer of the data access request has not timed out, where the timer of the data access request is started after receiving the data verification information sent from the client terminal.

Optionally, the processing unit 702 is further configured to:

Before obtaining the data access request from the third-party institution, obtain data verification information sent by the client terminal, where the data verification information includes a random number, a third-party public key, and the data scope and time of data access;

Based on the data access time, start the timer of the data access request, and register the random number, the third-party public key, and the data scope of the data access.

Optionally, the processing unit 702 is further configured to:

Before obtaining the data verification information sent by the client terminal, obtain the data storage information sent by the client terminal; the data storage information includes the user ID and the data ciphertext corresponding to the user ID; the data ciphertext is obtained after encrypting the data by the client terminal using the symmetric secret key of the client terminal;

The user ID data and the data ciphertext corresponding to the user ID is stored.

Optionally, the processing unit 702 is further configured to:

After storing the user ID and the data ciphertext corresponding to the user ID, obtain a new data ciphertext sent by the client terminal, and the new data ciphertext is obtained after encrypting a new data by the client terminal using the symmetric secret key;

Overwrite the data ciphertext with the new data ciphertext.

Optionally, the processing unit 702 is further configured to:

After storing the user ID and the data ciphertext corresponding to the user ID, obtain the data request sent by the client terminal;

Send the data ciphertext to the client terminal, such that the client terminal decrypts the data ciphertext and then encrypts the decrypted data with a new symmetric secret key;

obtain a data storage request sent by the client terminal, where the data storage request includes a new data ciphertext that is encrypted by the client terminal using the new symmetric secret key;

Overwrite the data ciphertext with the new data ciphertext.

Based on the similar technical concepts, an embodiment of the present invention provides a device for authorizing blockchain data access. The device includes at least one processor; and a memory communicatively coupled to the at least one processor. The memory stores computer instructions executable by the at least one processor, and the instructions can be executed by the at least one processor to cause the at least one processor to perform the blockchain data access authorization process in the above embodiments.

Figure 8:
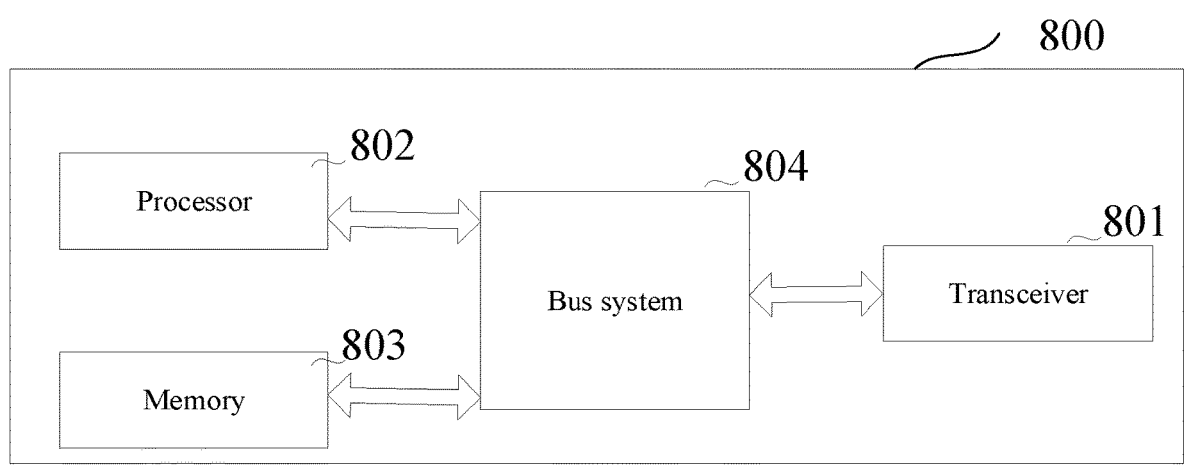
FIG. 8 illustrates a structural diagram of a blockchain data access authorization device according to an embodiment of the present invention.

Using one processor as an example, FIG. 8 shows a structure of a blockchain data access authorization device provided by an embodiment of the present invention. The blockchain data access authorization device 800 includes: a transceiver 801, a processor 802, a memory 803, and a bus system 804;

The memory 803 is used for storing computer programs. Specifically, the programs may include program codes, and the program codes includes computer operation instructions. The memory 803 may be random access memory (RAM), or may be non-volatile memory, such as at least one disk memory. Although only one memory is shown in the figure, of course, the number of memory can also be set as many as needed. Memory 803 may also be a memory in processor 802.

Memory 803 stores the following elements, executable modules or data structures, or a subset thereof, or an extended set thereof:

Operation instructions: including various operation instructions, which are used to realize various operations.

Operating system: including various system programs for implementing various basic services and handling hardware-based tasks.

The above-mentioned method for authorizing blockchain data access in the embodiments of the present invention may be applied to the processor 802, or implemented by the processor 802. The processor 802 may be an integrated circuit chip with signal processing capability. In the implementation process, each step of the above method for authorizing access to blockchain data can be completed by an integrated logic circuit of hardware in the processor 802 or instructions in the form of software. The above-mentioned processor 802 may be a general-purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments can be implemented or executed. A general purpose processor may be a microprocessor or the processor may be any conventional processor or the like. The steps of the method disclosed in conjunction with the embodiments of the present invention may be directly embodied as executed by a hardware decoding processor, or executed by a combination of hardware and software modules in the decoding processor. The software module may be located in random access memory, flash memory, read-only memory, programmable read-only memory or electrically erasable programmable memory, registers and other storage media mature in the art. The storage medium is located in the memory 803, and the processor 802 reads the information in the memory 803, and performs the following steps in combination with its hardware:

The transceiver 801 is used to obtain a data access request from a third-party institution. The data access request may include the user ID of the data access, the data scope, and the random number of the signature, wherein the random number of the signature is generated by the third-party institution after receiving a random number sent by the client terminal and signing on the received random number. The random number sent by the client terminal is generated after the client terminal receives the authorization request sent by the third-party institution and determines to authorize the data access from the third-party institution;

The processor 802 is configured to perform processing of the random number of the signature and the data scope;

The transceiver 801 is configured to, after determining that the verification is passed, send the data ciphertext corresponding to the user ID to the third-party institution, such that the third-party institution decrypts the data ciphertext using the data secret key sent by the client terminal.

Optionally, the processor 802 is specifically configured to:

Use the third-party public key to verify the random number of the signature, and use the data scope of the data access sent by the client terminal to verify the data scope Optionally, the processor 802 is further configured to:

Before obtaining the data access request from the third-party institution, obtain data verification information sent by the client terminal, where the data verification information includes a random number, a third-party public key, and the data scope and time of data access.

Optionally, the processor 802 is further configured to:

Before obtaining a data access request from a third-party institution, obtain data verification information sent by the client terminal, where the data verification information includes a random number, a third-party public key, and the data scope and time of data access;

Based on the data access time, start the timer of the data access request, and register the random number, the third-party public key, and the data scope of the data access.

Optionally, the processor 802 is further configured to:

Before obtaining the data verification information sent by the client terminal, obtain the data storage information sent by the client terminal; the data storage information includes the user ID and the data ciphertext corresponding to the user ID; the data ciphertext is obtained after encrypting the data by the client terminal using the symmetric secret key of the client terminal;

The user ID data and the data ciphertext corresponding to the user ID is stored.

Optionally, the processor 802 is further configured to:

After storing the user ID and the data ciphertext corresponding to the user ID, obtain a new data ciphertext sent by the client terminal, and the new data ciphertext is obtained after encrypting a new data by the client terminal using the symmetric secret key;

Overwrite the data ciphertext with the new data ciphertext.

Optionally, the processor 802 is further configured to:

After storing the user ID and the data ciphertext corresponding to the user ID, obtain the data request sent by the client terminal;

Send the data ciphertext to the client terminal, such that the client terminal decrypts the data ciphertext and then encrypts the decrypted data with a new symmetric secret key;

Obtain a data storage request sent by the client terminal, where the data storage request includes a new data ciphertext that is encrypted by the client terminal using the new symmetric secret key;

Overwrite the data ciphertext with the new data ciphertext.

Those skilled in the art can understand that all or part of the steps in the above methods of the embodiments can be completed by instructing the relevant hardware through a program, and the program is stored in a storage medium and includes several instructions to make a device (may be a single-chip microcomputer, a chip, etc.) or a processor (hardware processor) to execute all or part of the steps of the methods in the various embodiments of the present application. The aforementioned storage medium includes: U disk, portable hard disk, Read-Only Memory (ROM), Random Access Memory (RAM), magnetic disk or optical disk and/or other media that can store program codes.

Based on the similar technical concepts, an embodiment of the present invention also provides a computing device, including:

A memory used for storing program instructions;

A processor used for calling the program instructions stored in the memory, and executing the above blockchain data access authorization method according to the obtained program.

Based on the similar technical concepts, an embodiment of the present invention also provides a computer-readable non-volatile storage medium, including computer-readable instructions, when the computer reads and executes the computer-readable instructions, the computer executes the above-mentioned blockchain data access authorization method.

The present disclosure has been described with reference to flowchart illustrations and/or block diagrams of methods, apparatus (system), and computer program products according to embodiments of the present invention. It will be understood that each flow and/or each block of the flowchart illustrations and/or block diagrams, or any combination of the flows and/or blocks of the flowchart illustrations and/or block diagrams can be implemented in computer program instructions. These computer program instructions can be provided to a processor of a general-purpose computer, special purpose computer, embedded processor, or other programmable data processing apparatus to produce a machine for the execution of the instructions. With the execution by the processor of the computer or other programmable data processing apparatus, functions specified in one or more flows and/or one or more blocks of the flowchart illustrations and/or block diagrams can be implemented.

The computer program instructions can also be stored in a computer readable memory that can direct the computer or other programmable data processing apparatus to operate in a particular manner, such that the instructions stored in the computer readable memory produce an article of manufacture comprising the instruction apparatus. The apparatus implements the functions specified in one or more flows and/or one or more blocks of the flowchart illustrations and/or block diagrams.

These computer program instructions can also be loaded onto the computer or other programmable data processing apparatus such that a series of operational steps are performed on the computer or other programmable apparatus to produce computer-implemented processing for execution on the computer or other programmable apparatus. The instructions provide steps for implementing the functions specified in one or more flows and/or one or more blocks of the flowchart illustrations and/or block diagrams.

While certain embodiments of the present invention have been described, it is understood that a person of ordinary skill in the art can modify or change the embodiments after knowing the basic inventive concept. Therefore, the appended claims are intended to be interpreted as including the disclosed embodiments and the modifications and changes falling within the scope of the present invention.

It is apparent that those skilled in the art can make various modifications and variations to the invention without departing from the spirit and scope of the invention. Thus, it is intended that the present invention cover the modifications and variations of the invention.

What is claimed is:

1. A method for authorizing a blockchain data access, comprising:
    sending, by a third-party institution, an authorization request to a client terminal, the third-party institution being a bankcard issuing platform, and the client terminal corresponding to a user or an applicant of a bankcard, the authorization request being a request initiated by the third-party institution and directed to the user or the applicant for verifying and authorizing the bankcard issuing platform to access data of the user or the applicant;
    receiving, by the third-party institution, a random number generated by the client terminal in response to that the client terminal determines to authorize the third-party institution to access blockchain data corresponding to a user ID of the user or the applicant;
    signing, by the third-party institution, the random number to obtain a signed random number;
    obtaining, by a blockchain platform, a data access request from the third-party institution, wherein the data access request includes the user ID of data access, a data scope, and the signed random number, the blockchain platform being independent from the third-party institution;
    performing, by the blockchain platform, a verification on the signed random number and the data scope; and
    after determining that the verification is passed, sending, by the blockchain platform, data ciphertext corresponding to the user ID to the third-party institution, such that the third-party institution decrypts the data ciphertext using a data secret key sent by the client terminal.

2. The method according to claim 1, wherein the performing, by a blockchain platform, a verification on the signed random number and the data scope, further includes:
    using, by the blockchain platform, the third-party public key to verify the signed random number; and
    using, by the blockchain platform, a data scope of data access sent by the client terminal to verify the data scope.

3. The method according to claim 1, wherein, before sending data ciphertext corresponding to the user ID to the third-party institution, the method further includes:
    determining, by the blockchain platform, that a timer of the data access request has not timed out, wherein the timer of the data access request is started after receiving data verification information sent from the client terminal and indicates a valid time period for the authorization request of the third-party institution.

4. The method according to claim 1, wherein, before obtaining the data access request from the third-party institution, the method further includes:

obtaining, by the blockchain platform, the data verification information sent by the client terminal, wherein the data verification information includes the random number, the third-party public key, the data scope of data access, and the time of data access; and starting, by the blockchain platform, the timer of the data access request according to the time of data access, and registering the random number, the third-party public key, and the data scope of data access.

5. The method according to claim 4, wherein, before obtaining the data verification information sent by the client terminal, the method further includes:

obtaining, by the blockchain platform, data storage information sent by the client terminal, wherein the data storage information includes the user ID and the data ciphertext corresponding to the user ID, and wherein the data ciphertext is obtained after encrypting the data by the client terminal using the symmetric secret key of the client terminal; and storing, by the blockchain platform, the data ciphertext corresponding to the user ID and the user ID.

6. The method according to claim 5, wherein, after storing the data ciphertext corresponding to the user ID and the user ID, the method further includes:

obtaining, by the blockchain platform, a new data ciphertext sent by the client terminal, wherein the new data ciphertext is obtained after encrypting a new data by the client terminal using the symmetric secret key; and overwriting, by the blockchain platform, the data ciphertext with the new data ciphertext.

7. The method according to claim 5, wherein, storing the data ciphertext corresponding to the user ID and the user ID, the method further includes:

obtaining, by the blockchain platform, a data request sent by the client terminal;

sending, by the blockchain platform, the data ciphertext to the client terminal, such that the client terminal decrypts the data ciphertext and encrypts the data with a new symmetric secret key;

obtaining, by the blockchain platform, a data storage request sent by the client terminal, wherein the data storage request includes a new data ciphertext that is encrypted by the client terminal using the new symmetric secret key; and overwriting, by the blockchain platform, the data ciphertext with the new data ciphertext.

8. The method according to claim 1, wherein:

every time in response to that the third-party institution sends the authorization request, the random number is generated by the client terminal and sent to both the third-party institution and the blockchain platform at the same time; and the random numbers generated in response to authorization requests of the same third-party institution sent at different times are different.

9. The method according to claim 1, wherein performing, by the blockchain platform, verification on the signed random number and the data scope comprises:

verifying the signed random number through a deployed smart contract.

10. A blockchain data access authorization apparatus, comprising:

at least one processor; and a memory communicatively coupled to the at least one processor;

wherein the memory is configured to store instructions, and the at least one processor is configured to execute the instructions to:

obtain a data access request from a third-party institution, wherein before the data access request is obtained, an authorization request is sent by the third-party institution to a client terminal, a random number is generated by the client terminal in response to that the client terminal determines to authorize the third-party institution to access blockchain data corresponding to a user ID and is received by the third-party institution, the random number is signed by the third-party institution to generate a signed random number, and the data access request includes the user ID of data access, a data scope, and the signed random number, wherein the third-party institution is a bankcard issuing platform, the client terminal corresponding to a user or an applicant of a bankcard, and the blockchain data access authorization apparatus is independent from the third-party institution, the authorization request being a request initiated by the third-party institution and directed to the user or the applicant for verifying and authorizing the bankcard issuing platform to access data of the user or the applicant;

perform a verification on the signed random number and the data scope; and after determining that the verification is passed, send data ciphertext corresponding to the user ID to the third-party institution, such that the third-party institution decrypts the data ciphertext using a data secret key sent by the client terminal.

11. The apparatus according to claim 10, wherein the at least one processor is further configured to:

use the third-party public key to verify the signed random number; and use a data scope of data access sent by the client terminal to verify the data scope.

12. The apparatus according to claim 10, wherein the at least one processor is further configured to:

before sending the data ciphertext corresponding to the user ID to the third-party institution, determine that a timer of the data access request has not timed out, wherein the timer of the data access request is started after receiving data verification information sent from the client terminal.

13. The apparatus according to claim 10, wherein the at least one processor is further configured to:

before obtaining the data access request from the third-party institution, obtain the data verification information sent by the client terminal, wherein the data verification information includes the random number, the third-party public key, the data scope of data access, and the time of data access; and start the timer of the data access request according to the time of data access, and registering the random number, the third-party public key, and the data scope of data access.

14. The apparatus according to claim 13, wherein the at least one processor is further configured to:

before obtaining the data verification information sent by the client terminal, obtain data storage information sent by the client terminal, wherein the data storage information includes the user ID and the data ciphertext corresponding to the user ID, and wherein the data ciphertext is obtained after encrypting the data by the client terminal using the symmetric secret key of the client terminal; and store the data ciphertext corresponding to the user ID and the user ID.

15. The apparatus according to claim 14, wherein the at least one processor is further configured to:
    after storing the data ciphertext corresponding to the user ID and the user ID, obtain a new data ciphertext sent by the client terminal, wherein the new data ciphertext is obtained after encrypting a new data by the client terminal using the symmetric secret key; and
    overwrite the data ciphertext with the new data ciphertext.

16. The apparatus according to claim 14, wherein the at least one processor is further configured to:
    obtain a data request sent by the client terminal;
    send the data ciphertext to the client terminal, such that the client terminal decrypts the data ciphertext and encrypts the data with a new symmetric secret key;
    obtain a data storage request sent by the client terminal, wherein the data storage request includes a new data ciphertext that is encrypted by the client terminal using the new symmetric secret key; and
    overwrite the data ciphertext with the new data ciphertext.

17. A non-transitory computer-readable storage medium containing computer-executable instructions that, when executed by one or more processors, causing the one or more processors to perform:
    obtaining, by a blockchain platform, a data access request from a third-party institution, wherein before the data access request is obtained, an authorization request is sent by the third-party institution to a client terminal, a random number is generated by the client terminal in response to that the client terminal determines to authorize the third-party institution to access blockchain data corresponding to a user ID and is received by the third-party institution, the random number is signed by the third-party institution to generate a signed random number, and the data access request includes the user ID of data access, a data scope, and the signed random number, wherein the third-party institution is a bankcard issuing platform, the client terminal corresponding to a user or an applicant of a bankcard, and the blockchain data access authorization apparatus is independent from the third-party institution, the authorization request being a request initiated by the third-party institution and directed to the user or the applicant for verifying and authorizing the bankcard issuing platform to access data of the user or the applicant;
    performing, by the blockchain platform, a verification on the signed random number and the data scope; and
    after determining that the verification is passed, sending, by the blockchain platform, data ciphertext corresponding to the user ID to the third-party institution, such that the third-party institution decrypts the data ciphertext using a data secret key sent by the client terminal.

18. The non-transitory computer-readable storage medium according to claim 17, wherein the performing, by a blockchain platform, a verification on the random number of the signature and the data scope, further includes:
    using, by the blockchain platform, the third-party public key to verify the signed random number; and
    using, by the blockchain platform, a data scope of data access sent by the client terminal to verify the data scope.

19. The non-transitory computer-readable storage medium according to claim 17, wherein, before sending data ciphertext corresponding to the user ID to the third-party institution, the computer-executable instructions further cause the one or more processors to perform:
    determining, by the blockchain platform, that a timer of the data access request has not timed out, wherein the timer of the data access request is started after receiving data verification information sent from the client terminal.

20. The non-transitory computer-readable storage medium according to claim 17, wherein, before obtaining the data access request from the third-party institution, the computer-executable instructions further cause the one or more processors to perform:
    obtaining, by the blockchain platform, the data verification information sent by the client terminal, wherein the data verification information includes the random number, the third-party public key, the data scope of data access, and the time of data access; and
    starting, by the blockchain platform, the timer of the data access request according to the time of data access, and registering the random number, the third-party public key, and the data scope of data access.

* * * * *